Sept. 30, 1924.

R. H. BOWERS 1,509,927

CAN OPENER AND PARING KNIFE

Filed March 24, 1922

Inventor

R. H. Bowers.

By Lacey & Lacey, Attorney

Patented Sept. 30, 1924.

1,509,927

UNITED STATES PATENT OFFICE.

ROBERT H. BOWERS, OF NASHVILLE, TENNESSEE.

CAN OPENER AND PARING KNIFE.

Application filed March 24, 1922. Serial No. 546,466.

*To all whom it may concern:*

Be it known that I, ROBERT H. BOWERS, a citizen of the United States, residing at Nashville, in the county of Davidson and State of Tennessee, have invented certain new and useful Improvements in Can Openers and Paring Knives, of which the following is a specification.

My invention relates to can openers and has for its object to provide an implement of this class that is simple and strongly constructed and is given such a shape that the work for which it is intended may be performed effectually without danger of injury to the operator.

Another object of the invention is to construct the implement in the form of a knife with a thin blade so that the contents, such as fruit, contained in the can will not be cut up or spoiled in any way but will retain the original shape and size. On account of its particular shape the implement may also be used for peeling fruit as it is provided with a sharp edge on one side of the blade, in other words, the implement forms a combination of can opener and paring knife.

In the accompanying drawing—

Figure 3:
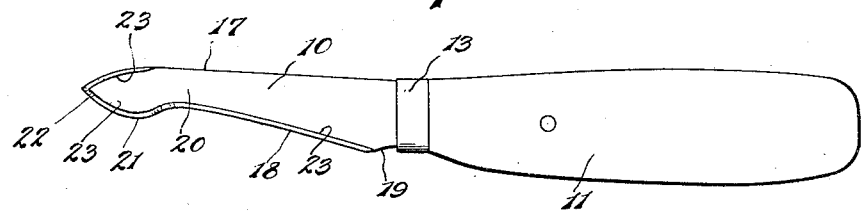
Figure 3 is a plan view of the implement.
Figure 4:
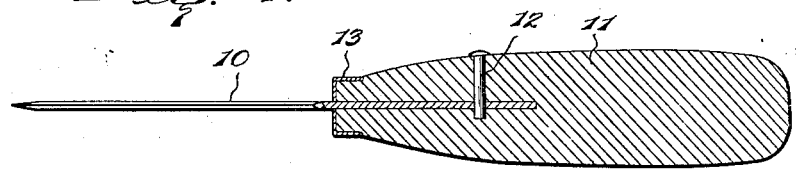
Figure 4 is a longitudinal section of Figure 3.

The implement consists of a blade 10 and a handle 11 which may be made of wood or any other suitable material, as indicated in Figures 3 and 4. The blade is rigidly secured in the handle by means of a rivet 12 and a sleeve or cuff 13 around the blade and the handle where they are joined together.

Figure 5:
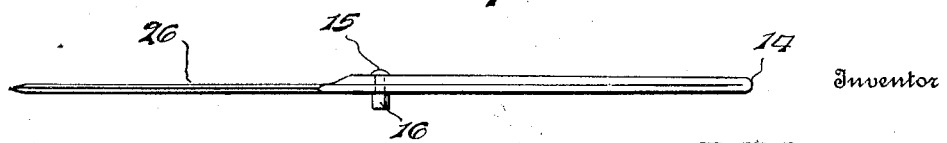
Figure 5 is a modified form of a can opener.

Instead of using a wooden handle, the implement might be made out of a single piece of metal which is turned back on itself at the extreme end 14, see Figure 5, and doubled up and secured by means of a rivet 15 near the blade portion 26 of the implement. This rivet 15 is provided with a protruding stud 16 which is intended to form a stop to prevent the implement from slipping too far into the can.

Whether a wooden handle or a steel handle is used, the shape of the blade 10 or 16 is the same and it has preferably a straight blunt back 17 and a sharp edge 18 on the opposite side of the blade. It has its greatest width near the handle, as at 19, and the cutting edge 18 tapers toward the back so as to be narrow at 20, from where it swells outwardly, as at 21, in the shape of an ogee. The back and the edge are thereupon tapering together to form a sharp point 22 of lancet shape.

Figure 1:
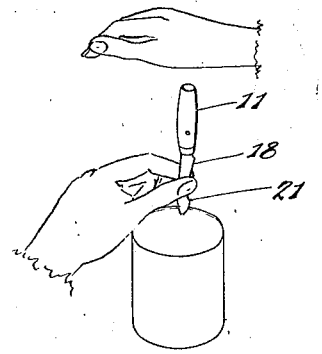
Figure 1 represents a perspective view of the implement as first applied to a can to be opened.
Figure 2:
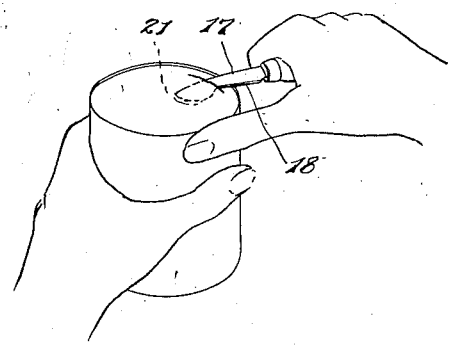
Figure 2 is a similar view on larger scale showing the use of the can opener after the top has been pierced.

The use of the implement is as follows: The can opener is held, as indicated in Figure 1, in upright position with edge 18 away from the hand and a light blow is given at the rear end of the handle 11 so that the point 22 will pierce the top of the can. As soon as this is done, the implement is tilted toward one side, as indicated in Figure 2, and held with the cutting edge 18 toward the thumb of the operator and the top of the can is in this manner gradually severed from the can itself by cutting around the edge thereof. The function of the swell 21 on the edge is to prevent the implement from slipping away from the top, and in this manner avoid an accident of cutting the operator's finger. The shoulder formed by the sleeve 13 at the inner end of the blade 10 will prevent the slipping of the implement too far into the can. When a metal handle, as in Figure 5, is used, the stud 16 answers the same purpose.

On account of the thinness of the blade, it is possible to keep the inwardly projecting point of the implement closely under the top of the lid during the operation as seen in Figure 2, so that in this manner fruit, such as peaches, pears, cherries, will not in any way be cut or injured during the opening of a can.

It might be said that an ordinarily shaped knife would serve for the same purpose but in that case the security from injuring the operator would not be present as in the described invention. The swell 21 on the cutting edge 18 will not permit the slipping out of the implement to do any harm.

The sharp edge of the blade extends from the sleeve 13 to the point 22 and preferably up along the curved portion of the back 17 of the blade. In this manner, the point itself is extremely sharp and facilitates the cutting of the tin can so that a great deal of force is not needed to pierce the top thereof.

The implement is manufactured in such a a manner that the temper remains permanently therein and for this purpose it is sharpened before being tempered which leaves the tempering quality practically intact in the blade. Ordinary knife sharpeners will not effect the temper when sharpening this implement and if an attempt were made to change an ordinary knife to this form, the temper thereof would be destroyed, or, in other words, it would be dull at the most important part of the cutting edge, because the tempered portion runs at a uniform depth along the edge of a knife. And this depth would be passed if a nick or depression were afterwards made to simulate the blade of this implement.

The blade used for this can opener must, of course, be made of high grade steel.

The cross section of the blade may either be like that of an ordinary table knife, that is to say, having a straight taper on both sides from the back to the cutting edge, which must be properly tempered including the piercing point. Or the blade may have substantially parallel top and bottom sides with the cutting edge 18 and the point 22 formed by providing a narrow bevel along the edge on one or both of the top and bottom sides, as indicated by line 23 in Figure 3.

It should be noted that by holding the can opener in the position shown in Figure 2, that is, with the blade horizontally, the cutting of the tin plate is greatly facilitated, and the sharpness of the blade is longer preserved. Using the opener in this manner simulates carving as the blade is slightly moved in and out in its length direction during operation, whereby the cutting is spread along the edge of the blade. Using an ordinary can opener, held in upright position, practically a single point on the edge does the cutting which will very soon dull the instrument.

Having thus described the invention, what is claimed as new is:

An implement of the class described, comprising a thin blade, a handle formed by doubling one end of the blade upon itself so that the flat sides come in contact, a stud through said handle provided with an enlarged head, said blade having a sharp front edge, and a straight blunt back terminating with a short sharp edge forming a lancet point with said front edge, said front edge having an ogee adjacent said lancet point and tapering away from said back making the width of the blade greatest close to the handle.

In testimony whereof I affix my signature.

ROBERT H. BOWERS. [L. S.]